United States Patent
Boyle et al.

(10) Patent No.: US 9,146,875 B1
(45) Date of Patent: Sep. 29, 2015

(54) HYBRID DRIVE CONVERTING NON-VOLATILE SEMICONDUCTOR MEMORY TO READ ONLY BASED ON LIFE REMAINING

(75) Inventors: William B. Boyle, Lake Forest, CA (US); Mei-Man L. Syu, Fremont, CA (US); William C. Cain, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 378 days.

(21) Appl. No.: 13/105,785

(22) Filed: May 11, 2011

Related U.S. Application Data

(60) Provisional application No. 61/372,049, filed on Aug. 9, 2010.

(51) Int. Cl.
  G06F 12/08 (2006.01)
  G06F 3/06 (2006.01)
  G06F 12/02 (2006.01)

(52) U.S. Cl.
  CPC ............ G06F 12/0866 (2013.01); *G06F 3/068* (2013.01); *G06F 3/0679* (2013.01); *G06F 12/0246* (2013.01); *G06F 2212/1036* (2013.01); *G06F 2212/7205* (2013.01)

(58) Field of Classification Search
  CPC .............. G06F 3/0679; G06F 12/0246; G06F 2212/7211; G06F 12/0866; G06F 2212/1032; G06F 2212/1036; G06F 2212/2022; G06F 2212/72
  USPC .......................................... 711/103
  See application file for complete search history.

(56) References Cited

U.S. PATENT DOCUMENTS

| | | |
|---|---|---|
| 5,333,138 A | 7/1994 | Richards et al. |
| 5,581,785 A | 12/1996 | Nakamura et al. |
| 5,586,291 A | 12/1996 | Lasker et al. |
| 5,701,516 A * | 12/1997 | Cheng et al. .................... 710/22 |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,754,021 B2 | 6/2004 | Kisaka et al. |
| 6,807,630 B2 | 10/2004 | Lay et al. |
| 6,909,574 B2 | 6/2005 | Aikawa et al. |
| 6,941,423 B2 * | 9/2005 | Coulson ........................ 711/141 |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Charles Rones
*Assistant Examiner* — Andrew Russell

(57) ABSTRACT

A hybrid drive is disclosed comprising a head actuated over a disk comprising a plurality of data tracks, and a non-volatile semiconductor memory (NVSM) comprising a plurality of memory segments. When a life remaining of the NVSM falls below a threshold, the NVSM is marked as read only. When a write command is received from a host including write data, and when the NVSM is marked as read only, the write data is written to the disk and a corresponding memory segment in the NVSM is invalidated.

26 Claims, 5 Drawing Sheets

(56) References Cited

U.S. PATENT DOCUMENTS

| | | | |
|---|---|---|---|
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,142,385 B2 | 11/2006 | Shimotono et al. | |
| 7,334,082 B2 | 2/2008 | Grover et al. | |
| 7,395,452 B2 | 7/2008 | Nicholson et al. | |
| 7,409,489 B2* | 8/2008 | Sinclair | 711/103 |
| 7,411,757 B2 | 8/2008 | Chu et al. | |
| 7,461,202 B2 | 12/2008 | Forrer, Jr. et al. | |
| 7,472,222 B2 | 12/2008 | Auerbach et al. | |
| 7,477,477 B2 | 1/2009 | Maruchi et al. | |
| 7,509,471 B2 | 3/2009 | Gorobets | |
| 7,516,346 B2 | 4/2009 | Pinheiro et al. | |
| 7,525,745 B2* | 4/2009 | Nitta | 360/31 |
| 7,610,438 B2 | 10/2009 | Lee et al. | |
| 7,613,876 B2 | 11/2009 | Bruce et al. | |
| 7,634,585 B2* | 12/2009 | Conley et al. | 710/1 |
| 7,644,231 B2 | 1/2010 | Recio et al. | |
| 7,685,360 B1 | 3/2010 | Brunnett et al. | |
| 7,752,491 B1 | 7/2010 | Liikanen et al. | |
| 7,840,753 B1* | 11/2010 | Booth | 711/113 |
| 8,341,339 B1* | 12/2012 | Boyle et al. | 711/103 |
| 8,356,152 B2* | 1/2013 | You | 711/165 |
| 2004/0083333 A1* | 4/2004 | Chang et al. | 711/103 |
| 2005/0172074 A1* | 8/2005 | Sinclair | 711/114 |
| 2006/0069850 A1* | 3/2006 | Rudelic | 711/103 |
| 2006/0184720 A1* | 8/2006 | Sinclair et al. | 711/103 |
| 2006/0195657 A1 | 8/2006 | Tien et al. | |
| 2007/0033362 A1* | 2/2007 | Sinclair | 711/165 |
| 2007/0162693 A1* | 7/2007 | Nam | 711/113 |
| 2007/0168606 A1* | 7/2007 | Takai et al. | 711/113 |
| 2007/0180186 A1* | 8/2007 | Cornwell et al. | 711/103 |
| 2007/0266200 A1* | 11/2007 | Gorobets et al. | 711/103 |
| 2008/0024899 A1* | 1/2008 | Chu et al. | 360/69 |
| 2008/0040537 A1 | 2/2008 | Kim | |
| 2008/0059694 A1 | 3/2008 | Lee | |
| 2008/0104308 A1* | 5/2008 | Mo et al. | 711/103 |
| 2008/0130156 A1 | 6/2008 | Chu et al. | |
| 2008/0177938 A1 | 7/2008 | Yu | |
| 2008/0222353 A1* | 9/2008 | Nam et al. | 711/113 |
| 2008/0256287 A1 | 10/2008 | Lee et al. | |
| 2008/0276016 A1* | 11/2008 | Fujibayashi | 710/36 |
| 2008/0279005 A1* | 11/2008 | France | 365/185.11 |
| 2008/0282045 A1* | 11/2008 | Biswas et al. | 711/159 |
| 2008/0294813 A1* | 11/2008 | Gorobets | 710/62 |
| 2008/0307270 A1 | 12/2008 | Li | |
| 2009/0019218 A1 | 1/2009 | Sinclair et al. | |
| 2009/0031072 A1 | 1/2009 | Sartore | |
| 2009/0103203 A1 | 4/2009 | Yoshida | |
| 2009/0106518 A1 | 4/2009 | Dow | |
| 2009/0132760 A1* | 5/2009 | Flynn et al. | 711/113 |
| 2009/0144501 A2 | 6/2009 | Yim et al. | |
| 2009/0150599 A1 | 6/2009 | Bennett | |
| 2009/0172324 A1 | 7/2009 | Han et al. | |
| 2009/0193182 A1* | 7/2009 | Nitta | 711/103 |
| 2009/0249168 A1 | 10/2009 | Inoue | |
| 2009/0271562 A1 | 10/2009 | Sinclair | |
| 2009/0287878 A1* | 11/2009 | Yamamoto et al. | 711/103 |
| 2009/0307525 A1* | 12/2009 | Hiratsuka et al. | 714/8 |
| 2009/0327603 A1 | 12/2009 | McKean et al. | |
| 2010/0023681 A1* | 1/2010 | Sinclair et al. | 711/103 |
| 2010/0088459 A1 | 4/2010 | Arya et al. | |
| 2010/0095053 A1* | 4/2010 | Bruce et al. | 711/103 |
| 2010/0100675 A1* | 4/2010 | Furuhjelm | 711/113 |
| 2010/0122148 A1* | 5/2010 | Flynn et al. | 714/773 |
| 2010/0325352 A1* | 12/2010 | Schuette et al. | 711/103 |
| 2011/0029715 A1* | 2/2011 | Hu et al. | 711/103 |
| 2011/0099323 A1* | 4/2011 | Syu | 711/103 |
| 2011/0099326 A1* | 4/2011 | Jung et al. | 711/103 |
| 2011/0099458 A1* | 4/2011 | Reche et al. | 714/763 |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

* cited by examiner

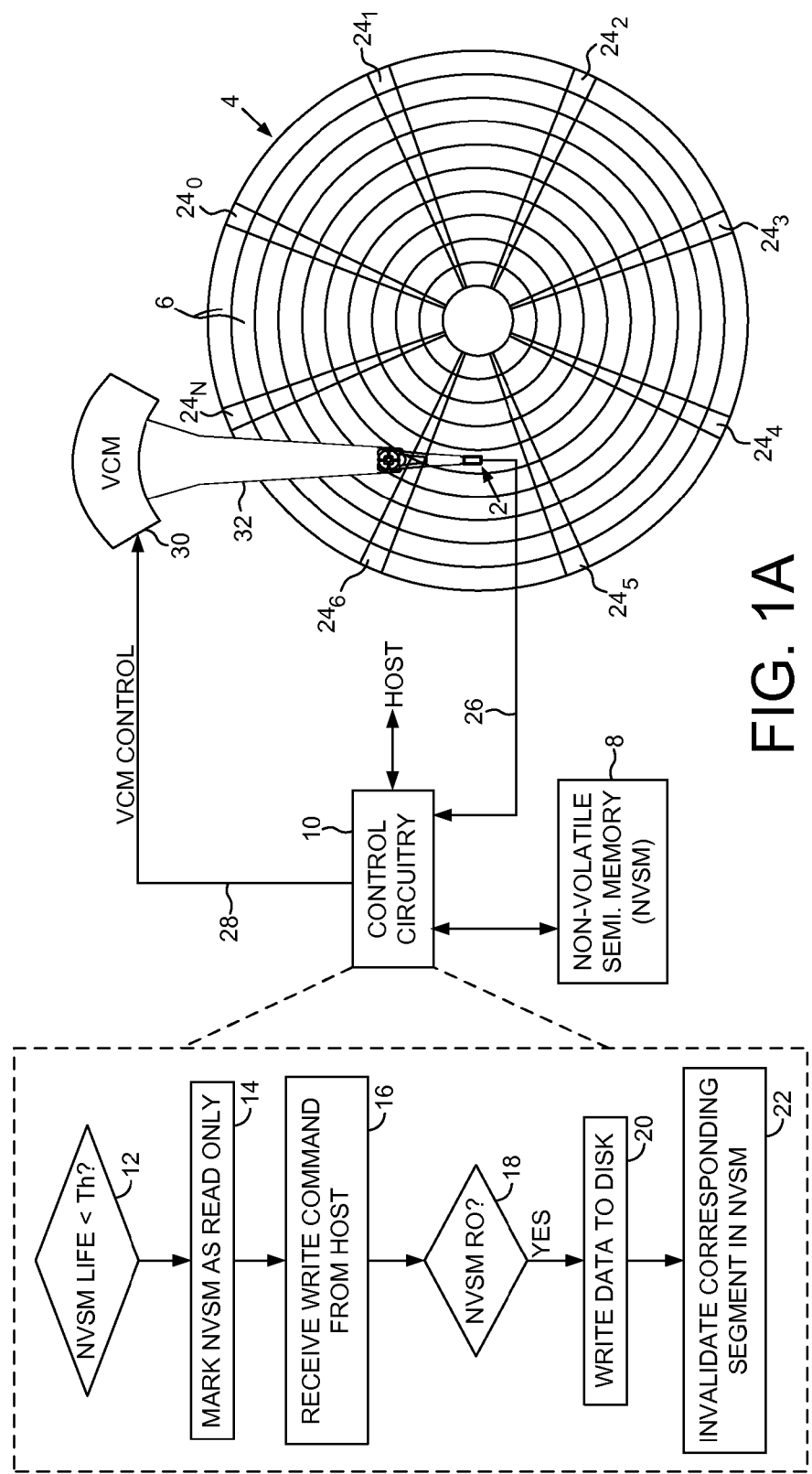

ently marked as read only (step 46). In one embodiment,
HYBRID DRIVE CONVERTING NON-VOLATILE SEMICONDUCTOR MEMORY TO READ ONLY BASED ON LIFE REMAINING

CROSS-REFERENCE TO RELATED APPLICATIONS

The present application claims priority from provisional U.S. Patent Application Ser. No. 61/372,049, filed on Aug. 9, 2010, the specification of which is incorporated herein by reference.

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

BRIEF DESCRIPTION OF THE DRAWINGS

FIG. 1A shows a hybrid drive according to an embodiment of the present invention comprising a head actuated over a disk and a non-volatile semiconductor memory (NVSM).

FIG. 1B is a flow diagram according to an embodiment of the present invention wherein when a life remaining of the NVSM falls below a threshold, the NVSM is marked as read only.

DETAILED DESCRIPTION OF EMBODIMENTS OF THE INVENTION

Figure 2A:
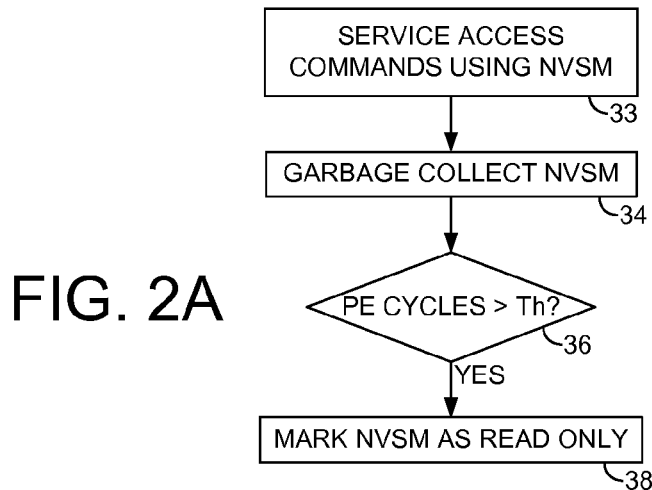
FIG. 2A is a flow diagram according to an embodiment of the present invention wherein a life remaining of the NVSM is determined based on a number of program/erase cycles.

FIG. 1A shows a hybrid drive according to an embodiment of the present invention comprising a head 2 actuated over a disk 4 comprising a plurality of data tracks 6, and a non-volatile semiconductor memory (NVSM) 8 comprising a plurality of memory segments. The hybrid drive further comprises control circuitry 10 for executing the flow diagram of FIG. 1B, wherein when a life remaining of the NVSM falls below a threshold (step 12), the NVSM is marked as read only (step 14). When a write command is received from a host including write data (step 16), and when the NVSM is marked as read only (step 18), the write data is written to the disk (step 20) and a corresponding memory segment in the NVSM is invalidated (step 22).

In the embodiment of FIG. 1A, the disk 4 comprises embedded servo sectors $24_0$-$24_N$ that define the data tracks 6. The control circuitry 10 processes a read signal 26 emanating from the head 2 to demodulate the servo sectors $24_0$-$24_N$ and generate a position error signal (PES) representing an error between the actual position of the head and a target position relative to a target track. The control circuitry 10 filters the PES using a suitable compensation filter to generate a control signal 28 applied to a voice coil motor (VCM) 30 which rotates an actuator arm 32 about a pivot in order to actuate the head 2 radially over the disk in a direction that reduces the PES.

Any suitable NVSM 8 may be employed in the embodiments of the present invention such as a suitable Flash memory. In one embodiment, the NVSM 8 comprises a plurality of blocks, wherein each block comprises a plurality of memory segments referred to as pages. The blocks are programmed a page at a time, and an entire block is erased in a unitary operation. In embodiments described in more detail below, a garbage collection operation may be executed on previously written blocks in order to copy valid pages to new blocks so that the previously written blocks may be erased and re-used.

In one embodiment, the number of program/erase cycles that may be performed on any given block is limited (referred to as endurance). Therefore, a wear leveling algorithm is typically executed which attempts to re-program the blocks evenly over the life of the NVSM so that the blocks tend to wear out together. In an embodiment shown in the flow diagram of FIG. 2A, access commands (write/read) are serviced using the NVSM (step 33) and the blocks in the NVSM garbage collected (step 34). The life remaining of the NVSM is determined (step 12 of FIG. 1B) based on the number of program/erase cycles executed on the NVSM. When the number of program/erase cycles exceeds a threshold (step 36), it is determined that the NVSM is approaching end of life and is therefore marked as read only (step 38).

Figure 2B:
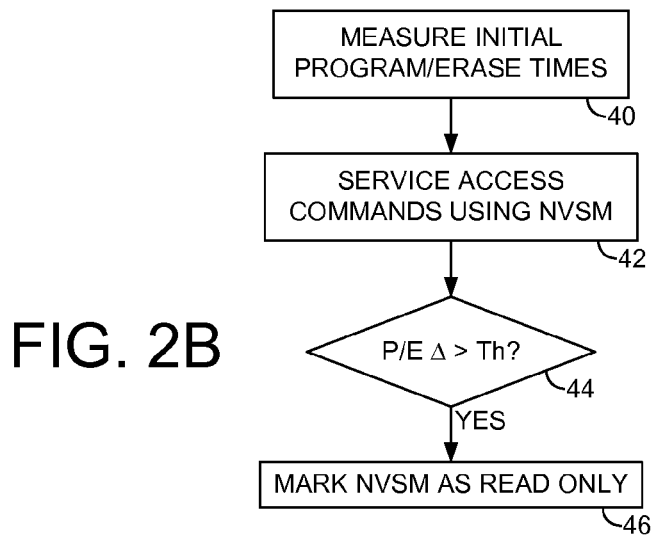
FIG. 2B is a flow diagram according to an embodiment of the present invention wherein a life remaining of the NVSM is determined based on a change in the program/erase time.

FIG. 2B is a flow diagram according to an alternative embodiment of the present invention for determining when the life remaining of the NVSM falls below a threshold. When the hybrid drive is initially deployed in the field, an initial program/erase time is measured (step 40). As access commands are serviced using the NVSM, the program/erase times are monitored (step 42), and when at least one of the program and erase times changes beyond a threshold (step 44), it is determined that the NVSM is approaching end of life and is therefore marked as read only (step 46). In one embodiment, the entire NVSM may be marked as read only when the average change in the program or erase time exceeds the threshold, and in another embodiment, each individual block may be marked as read only when its corresponding program or erase time changes beyond the threshold.

Figure 2C:
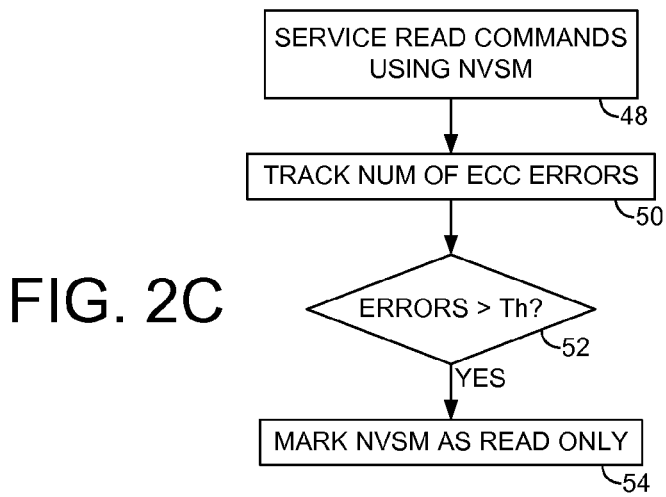
FIG. 2C is a flow diagram according to an embodiment of the present invention wherein a life remaining of the NVSM is determined based on a number of error correction code (ECC) errors detected during read operations.

FIG. 2C is a flow diagram according to an alternative embodiment of the present invention for determining when the life remaining of the NVSM falls below a threshold. As read commands are serviced using the NVSM (step 48), the number of ECC errors is monitored (step 50), and when the number of ECC errors exceeds a threshold (step 52), it is determined that the NVSM is approaching end of life and is therefore marked as read only (step 54). In one embodiment, the entire NVSM may be marked as read only when the average ECC errors exceeds the threshold, and in another embodiment, each individual block may be marked as read only when its corresponding ECC errors exceeds the threshold.

Figure 3A:
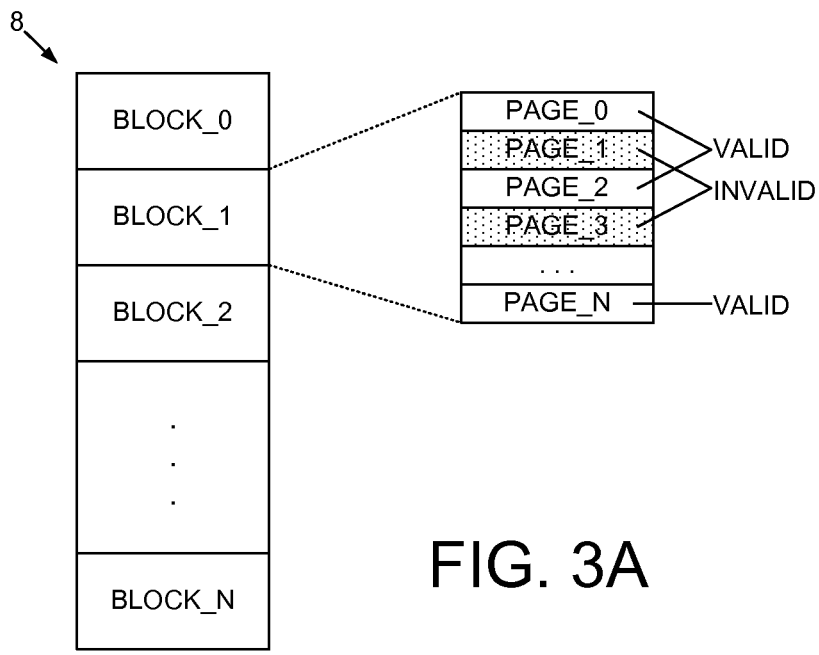
FIG. 3A shows an embodiment of the present invention wherein the NVSM comprises a plurality of blocks that are garbage collected before being erased in a unitary operation.

FIG. 3A shows an embodiment of the present invention wherein the NVSM comprises a plurality of blocks, and each block comprises a plurality of memory segments referred to as pages. Each page may comprise one or more data sectors, wherein each data sector is assigned a physical block address (PBA) accessed indirectly through a logical block address (LBA). When an LBA is overwritten, the write data is written to a new page and the old page becomes invalid. If all the pages of a block become invalid (due to overwriting the corresponding LBAs), the block may be erased and re-used. To facilitate the wear leveling algorithm, a garbage collection algorithm is typically executed periodically in order to copy valid pages in old blocks to new blocks so that the old blocks can be erased and re-used.

Figure 3B:
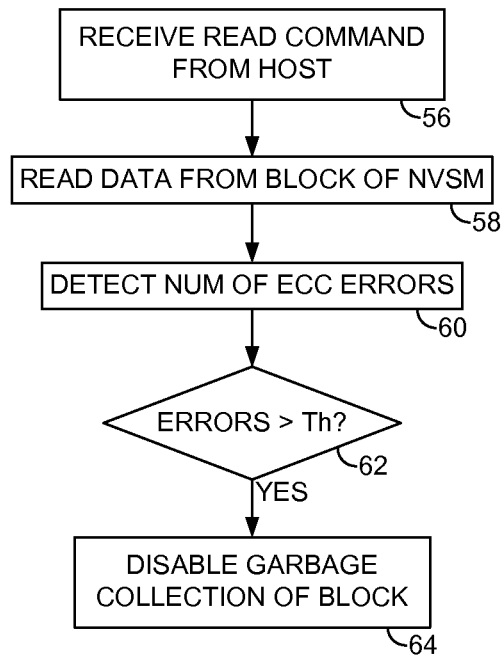
FIG. 3B is a flow diagram according to an embodiment of the present invention wherein when the number of ECC errors for a target block exceeds a threshold, the garbage collection of the target block is disabled.

FIG. 3B is a flow diagram according to an embodiment of the present invention wherein when a read command is received from a host (step 56), data is read from a target block in the NVSM (step 58) and the number of ECC errors detected (step 60). If the number of ECC errors exceeds a threshold (step 62), it is determined that the target block is reaching end of life and therefore the garbage collection on the target block is disabled (step 64). In this manner, the valid pages (FIG. 3A) will remain in the target block until the corresponding LBAs are overwritten, thereby maximizing the use of the target block. In one embodiment, the valid pages of a degrading block are copied to the disk 4 as a backup in the event the pages in the NVSM become unrecoverable.

Figure 4A:
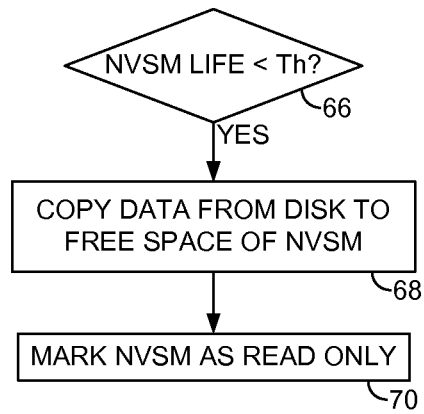
FIG. 4A is a flow diagram according to an embodiment of the present invention wherein when the life remaining of the NVSM falls below the threshold, data recorded on the disk is copied into the free space of the NVSM and then the NVSM is marked as read only.

FIG. 4A is a flow diagram according to an embodiment of the present invention wherein when the life remaining of the NVSM falls below the threshold (step 66), data is copied from the disk to the free memory segments of the NVSM (step 68) prior to marking the NVSM as read only (step 70). In this embodiment, the threshold at step 66 is selected relative to the amount of free memory segments available as well as the life of the NVSM so as to ensure the NVSM is able to perform the write operations needed to fill the free memory segments prior to converting the NVSM to read only. Any suitable data may be copied from the disk to the free memory segments of the NVSM, wherein in one embodiment, the data may be selected using a suitable migration algorithm that routes data to the NVSM or the disk based on predetermined criteria. For example, the migration algorithm may store frequently read, non-sequentially accessed LBAs in the NVSM and infrequently read, sequentially accessed LBAs on the disk. When the NVSM approaches end of life, the LBAs that were closest to being written to the NVSM originally (but were instead stored on the disk) are read from the disk and written to the free memory segments of the NVSM. In this manner, the free memory segments of the NVSM may further enhance performance by decreasing the access time to LBAs that would otherwise be read from the disk.

Figure 4B:
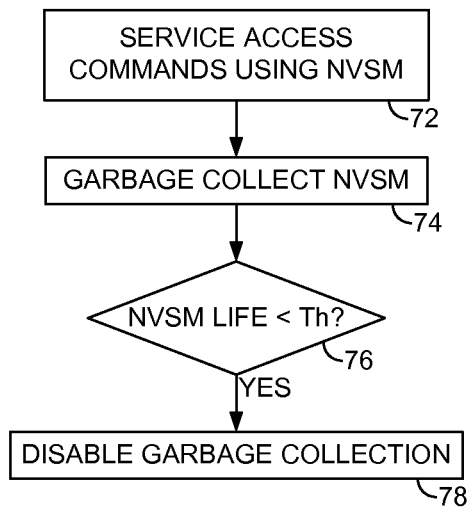
FIG. 4B is a flow diagram according to an embodiment of the present invention wherein when the life remaining of the NVSM falls below the threshold, the garbage collection of the blocks in the NVSM is disabled.

FIG. 4B is a flow diagram according to an embodiment of the present invention wherein after servicing a number of access commands using the NVSM (step 72), the valid pages in the previously written blocks are garbage collected (step 74) as described above with reference to FIG. 3A. When the life remaining of the NVSM falls below a threshold (step 76), the garbage collection of the blocks is disabled (step 78). With the garbage collection disabled, the free pages in the blocks of the NVSM are eventually filled with data during normal operation of the hybrid drive (e.g., using a suitable migration algorithm that routes data to the NVSM or to the disk based on any suitable criteria as described above). When all of the blocks are full of data (valid and invalid data), the NVSM is effectively converted to read only since there are no remaining free pages to service new write commands. The valid data may continue to be read from the NVSM until the corresponding LBAs are overwritten (by performing write operations to the disk) or until the valid data in the NVSM degrades so as to become unrecoverable. Similar to the embodiment described above, the valid data in the NVSM may be copied to the disk prior to degrading too far, thereby providing a backup copy that can still be recovered in the event the NVSM copy becomes unrecoverable.

Figure 5:
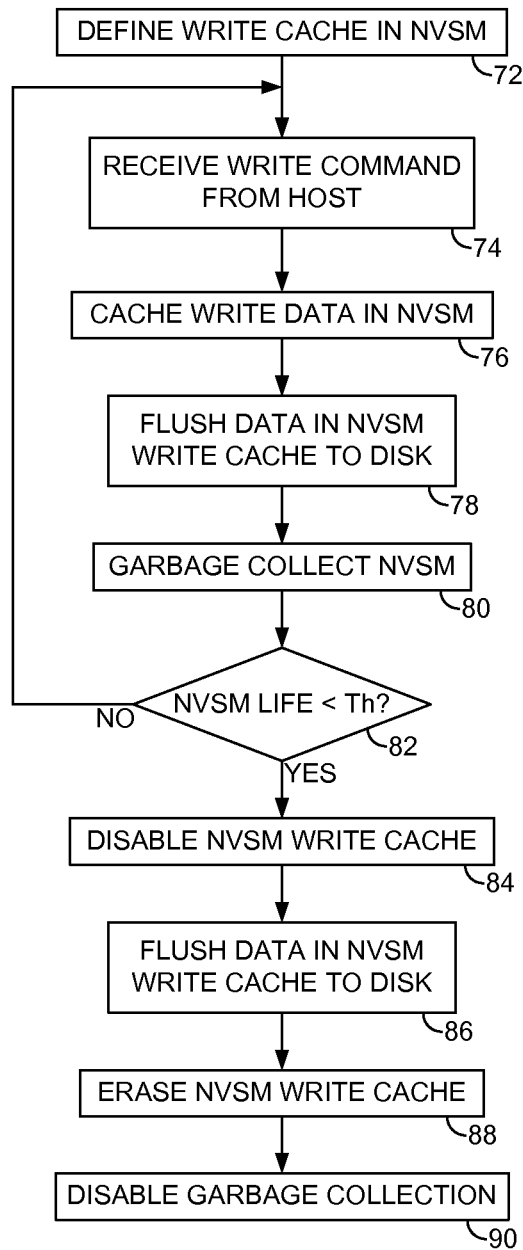
FIG. 5 is a flow diagram according to an embodiment of the present invention wherein when the life remaining of the NVSM falls below the threshold, a NVSM write cache is disabled and flushed to the disk, the NVSM write cache is erased, and the garbage collection of the NVSM is disabled.

FIG. 5 is a flow diagram according to an embodiment of the present invention wherein a write cache is defined (step 72) in the NVSM (e.g., a percentage of the capacity of the NVSM is reserved for the write cache). When a write command is received from a host (step 74), at least some of the write data is written to the NVSM write cache (step 76). This may improve performance of the hybrid drive by avoiding the mechanical latency in accessing the disk (seek latency of the head and rotational latency of the disk). A NVSM write cache may also improve performance of a hybrid drive by concurrently writing data to both the NVSM and the disk (i.e., using both channels simultaneously to increase bandwidth). When the disk drive is idle (not servicing host commands), the write data cached in the NVSM write cache is flushed to the disk (step 78) and the invalid pages in the blocks of the NVSM are garbage collected (step 80). When the life remaining of the NVSM falls below a threshold (step 82), the NVSM write cache is disabled (step 84) so that all write data targeted for the disk is written directly to the disk. When the disk drive is idle, the write data previously cached in the NVSM write cache is flushed to the disk (step 86), and the blocks allocated to the NVSM write cache are erased (step 88). The garbage collection of the blocks is disabled (step 90) so that the free blocks in the NVSM (including the NVSM write cache) are eventually filled with write data using a conventional migration algorithm as described above. When all of the free blocks have been written, the NVSM is converted into a read only memory. The valid data stored in the NVSM may still be accessed during read operations, thereby realizing the performance benefit of the NVSM until all of the data becomes invalid, or unrecoverable through degradation.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk comprising a plurality of data tracks;
   a head actuated over the disk;
   a non-volatile semiconductor memory (NVSM) comprising a plurality of blocks, each block comprising a plurality of memory segments; and
   control circuitry operable to:
      when a life remaining of the NVSM falls below a threshold, mark the NVSM as read only;
      receive a write command from a host including write data;
      concurrently write the write data to both the disk and the NVSM;
      when the NVSM is marked as read only, write the write data to the disk and permanently invalidate a corresponding memory segment in the NVSM;
      garbage collect the blocks comprising invalid memory segments; and
      when a number of error correction code (ECC) errors exceeds a threshold during a read operation of a target block, disable the garbage collection of the target block.

2. The hybrid drive as recited in claim 1, wherein the control circuitry is further operable to determine the life remaining of the NVSM based on a number of program/erase cycles executed on the NVSM.

3. The hybrid drive as recited in claim 1, wherein the control circuitry is further operable to determine the life remaining of the NVSM based on a change in at least one of a program time and an erase time of the NVSM.

4. The hybrid drive as recited in claim 1, wherein the control circuitry is further operable to determine the life remaining of the NVSM based on a number of error correction code (ECC) errors detected during read operations.

5. The hybrid drive as recited in claim 1, wherein prior to marking the NVSM as read only, the control circuitry is further operable to copy data from the disk to free memory segments of the NVSM.

6. The hybrid drive as recited in claim 1, wherein the control circuitry is further operable to:
   cache write data received from a host in the NVSM;
   flush the write data cached in the NVSM to the disk; and
   prior to marking the NVSM as read only, disable the caching of write data in the NVSM.

7. A hybrid drive comprising:
   a disk comprising a plurality of data tracks;
   a head actuated over the disk;
   a non-volatile semiconductor memory (NVSM) comprising a plurality of blocks, wherein each block comprises a plurality of memory segments; and
   control circuitry operable to:
      receive write data from a host;
      concurrently write the write data to both the disk and the NVSM;
      garbage collect the blocks comprising invalid memory segments; and
      when a life remaining of the NVSM falls below a threshold, permanently disable the garbage collection of the blocks.

8. The hybrid drive as recited in claim 7, wherein the control circuitry is further operable to determine the life remaining of the NVSM based on a number of program/erase cycles executed on the NVSM.

9. The hybrid drive as recited in claim 7, wherein the control circuitry is further operable to determine the life remaining of the NVSM based on a change in at least one of a program time and an erase time of the NVSM.

10. The hybrid drive as recited in claim 7, wherein the control circuitry is further operable to determine the life remaining of the NVSM based on a number of error correction code (ECC) errors detected during read operations.

11. The hybrid drive as recited in claim 7, wherein the control circuitry is further operable to:
    cache write data received from a host in the NVSM;
    flush the write data cached in the NVSM to the disk; and
    when the life remaining of the NVSM falls below the threshold, disable the caching of write data in the NVSM.

12. A hybrid drive comprising:
    a disk comprising a plurality of data tracks;
    a head actuated over the disk;
    a non-volatile semiconductor memory (NVSM) comprising a plurality blocks, wherein each block comprises a plurality of memory segments; and
    control circuitry operable to:
       receive write data from a host;
       concurrently write the write data to both the disk and the NVSM;
       garbage collect the blocks comprising invalid memory segments;
       when a life remaining of a target block falls below a threshold, the control circuitry is further operable to permanently disable the garbage collection of the target block while a valid page remains in the target block until a corresponding logical block address is overwritten; and
    determine the life remaining of the target block based on a change in at least one of a program time and an erase time of the target block.

13. The hybrid drive as recited in claim 12, wherein the control circuitry is further operable to determine the life remaining of the target block based on a number of error correction code (ECC) errors detected when reading the target block.

14. A method of operating a hybrid drive, the hybrid drive comprising a disk comprising a plurality of data tracks, a head actuated over the disk, and a non-volatile semiconductor memory (NVSM) comprising a plurality of blocks, each block comprising a plurality of memory segments, the method comprising:
    when a life remaining of the NVSM falls below a threshold, marking the NVSM as read only;
    receiving a write command from a host including write data;

concurrently writing the write data to both the disk and the NVSM;

when the NVSM is marked as read only, writing the write data to the disk and permanently invalidating a corresponding memory segment in the NVSM;

garbage collecting the blocks comprising invalid memory segments; and when a number of error correction code (ECC) errors exceeds a threshold during a read operation of a target block, disabling the garbage collection of the target block.

15. The method as recited in claim 14, further comprising determining the life remaining of the NVSM based on a number of program/erase cycles executed on the NVSM.

16. The method as recited in claim 14, further comprising determining the life remaining of the NVSM based on a change in at least one of a program time and an erase time of the NVSM.

17. The method as recited in claim 14, further comprising determining the life remaining of the NVSM based on a number of error correction code (ECC) errors detected during read operations.

18. The method as recited in claim 14, wherein prior to marking the NVSM as read only, further comprising copying data from the disk to free memory segments of the NVSM.

19. The method as recited in claim 14, further comprising:
caching write data received from a host in the NVSM;
flushing the write data cached in the NVSM to the disk; and
prior to marking the NVSM as read only, disabling the caching of write data in the NVSM.

20. A method of operating a hybrid drive, the hybrid drive comprising a disk comprising a plurality of data tracks, a head actuated over the disk, and a non-volatile semiconductor memory (NVSM) comprising a plurality of blocks, wherein each block comprises a plurality of memory segments, the method comprising:
receive write data from a host;
concurrently write the write data to both the disk and the NVSM;
garbage collecting the blocks comprising invalid memory segments; and
when a life remaining of the NVSM falls below a threshold, permanently disabling the garbage collection of the blocks.

21. The method as recited in claim 20, further comprising determining the life remaining of the NVSM based on a number of program/erase cycles executed on the NVSM.

22. The method as recited in claim 20, further comprising determining the life remaining of the NVSM based on a change in at least one of a program time and an erase time of the NVSM.

23. The method as recited in claim 20, further comprising determining the life remaining of the NVSM based on a number of error correction code (ECC) errors detected during read operations.

24. The method as recited in claim 20, further comprising:
caching write data received from a host in the NVSM;
flushing the write data cached in the NVSM to the disk; and
when the life remaining of the NVSM falls below the threshold, disabling the caching of write data in the NVSM.

25. A method of operating a hybrid drive, the hybrid drive comprising a disk comprising a plurality of data tracks, a head actuated over the disk, and a non-volatile semiconductor memory (NVSM) comprising a plurality of blocks, wherein each block comprises a plurality of memory segments, the method comprising:
receive write data from a host;
concurrently write the write data to both the disk and the NVSM;
garbage collecting the blocks comprising invalid memory segments;
when a life remaining of a target block falls below a threshold, permanently disabling the garbage collection of the target block while a valid page remains in the target block until a corresponding logical block address is overwritten; and
determining the life remaining of the target block based on a change in at least one of a program time and an erase time of the target block.

26. The method as recited in claim 25, further comprising determining the life remaining of the target block based on a number of error correction code (ECC) errors detected when reading the target block.

* * * * *